United States Patent [19]

Morimoto et al.

[11] Patent Number: 5,765,025

[45] Date of Patent: Jun. 9, 1998

[54] DIGITAL SIGNAL PROCESSOR WITH ON BOARD PROGRAM HAVING ARITHMETIC INSTRUCTIONS AND DIRECT MEMORY ACCESS INSTRUCTIONS FOR CONTROLLING DIRECT MEMORY ACCESS THEREOF

[75] Inventors: Minoru Morimoto; Yoshiji Yoshida, both of Hamamatsu, Japan

[73] Assignee: Yamaha Corporation, Hamamatsu, Japan

[21] Appl. No.: 542,729

[22] Filed: Oct. 13, 1995

[30] Foreign Application Priority Data

| Oct. 13, 1994 | [JP] | Japan | 6-274425 |
| Oct. 13, 1994 | [JP] | Japan | 6-274426 |
| Oct. 13, 1994 | [JP] | Japan | 6-274427 |

[51] Int. Cl.$^6$ ............................................. G06F 9/30
[52] U.S. Cl. ............................ 395/843; 395/846; 395/847
[58] Field of Search ............................ 395/842, 843, 395/847, 848, 846

[56] References Cited

U.S. PATENT DOCUMENTS

| Re. 34,850 | 2/1995 | Murakami et al. | 395/800 |
| 5,001,624 | 3/1991 | Hoffman et al. | 395/842 |
| 5,005,121 | 4/1991 | Nakada et al. | 395/846 |
| 5,237,667 | 8/1993 | Murakami et al. | 395/598 |
| 5,499,348 | 3/1996 | Araki et al. | 395/427 |
| 5,504,916 | 4/1996 | Murakami et al. | 395/427 |
| 5,535,417 | 7/1996 | Baji et al. | 395/842 |
| 5,634,076 | 5/1997 | Garde et al. | 395/842 |

*Primary Examiner*—Eddie P. Chan
*Assistant Examiner*—Gary J. Portka
*Attorney, Agent, or Firm*—Pillsbury Madison & Sutro LLP

[57] ABSTRACT

There is provided a method of controlling direct memory access for a digital signal-processing system. Direct memory access (DMA) instructions for executing data transfer by direct memory access between a data memory storing data and an external device are provided in a program, together with arithmetic processing instructions for executing arithmetic processing. The data transfer by the direct memory access is executed between the data memory and the external device according to each of the DMA instructions which has been decoded during execution of the program, upon decoding thereof. There is also provided a digital signal-processing system which causes data transfer by direct memory access to begin. An arithmetic operation device of the system arithmetically processes data read out from a data memory of the same under the control of decoded instructions of a program. The program contains DMA instructions for executing the data transfer by the direct memory access as well as arithmetic processing instructions. The data transfer by the direct memory access between an external device and the data memory is started when each of the DMA instructions is decoded during execution of the program.

14 Claims, 9 Drawing Sheets

DIGITAL SIGNAL PROCESSOR WITH ON BOARD PROGRAM HAVING ARITHMETIC INSTRUCTIONS AND DIRECT MEMORY ACCESS INSTRUCTIONS FOR CONTROLLING DIRECT MEMORY ACCESS THEREOF

BACKGROUND OF THE INVENTION

1. Field of the Invention

This invention relates to a digital signal-processing system which transfers data to be processed by a digital signal processor (DSP) and the like from an external device to an internal data memory by means of direct memory access (DMA), and a method of controlling the direct memory access, as well as a digital signal-processing system which executes data processing concurrently or in parallel with execution of the DMA transfer by the use of data memories other than one being accessed for the DMA transfer.

2. Prior Art

Conventionally, DSP's used in image processors, tone generators, etc., carry out filtering and other processing of various kinds, by once saving externally-supplied coefficient data and signal data to an internal data random access memory (RAM), carrying out arithmetic processing of these data by the use of a multiplier and an arithmetic logical unit (ALU) provided within the DSP, and then storing the results of the data processing in the data RAM, followed by delivering the processed data to an external device. Due to the limited capacity of the internal data RAM of the DSP, additional coefficient data and signal data have to be supplied for processing from external memories or the like by the DMA transfer during time intervals between processings. Results of the arithmetic processing are also transferred to external memories or the like by the DMA transfer during time intervals between processings.

Conventionally, DMA transfer between internal memories of a DSP and external devices is controlled by a host CPU provided outside the DSP, which controls a DMA controller for controlling the DMA transfer according to the actual execution of the processing by the DSP.

However, a problem with the control of the DMA controller by the host CPU, i.e., the control of the DMA transfer between the DSP and the external devices, is that correlated operations of the DMA transfer by the host CPU and the data processing by the DSP result in a waste of time on both the DSP and host CPU sides. For example, when the DSP has completed the processing of data currently stored therein and requires further data, the DSP stops processing and interrupts the host CPU to supply the further data to the DSP. Responsive to this interrupt, the host CPU commands the DMA controller to start DMA transfer of the requested data. After completion of the data transfer, the host CPU permits the DSP to resume data processing. Thus, the DSP suffers from a time loss due to temporary suspension of the data processing, while the host CPU suffers from a burden for the interrupt processing.

Further, a program defining arithmetic operation or processing to be executed by the DSP is transferred from the CPU into a program RAM within the DSP for temporary storage therein before execution thereof.

In this kind of DSP, access to the program RAM during execution of the program stored therein is essentially impossible. Therefore, to execute a large-sized program, it is necessary to provide the DSP with an internal program RAM having sufficient capacity or to forcibly interrupt execution of data processing by the DSP to permit the CPU to write a continued portion of the program into the program RAM.

However, the former measure causes an increase in the manufacturing cost of the hardware, while the latter measure degrades the data processing efficiency and causes an increased burden on the CPU.

SUMMARY OF THE INVENTION

It is a first object of the invention to provide a digital signal-processing system and a direct memory access control method which are capable of eliminating a waste of time due to correlated operations between the DSP and the CPU, thereby enhancing the data processing efficiency of the whole system.

It is a second object of the invention to provide a digital signal-processing system which is capable of executing a large-sized program with high efficiency without increasing the burden on the CPU, even with the use of a program memory having a small capacity.

It is a third object of the invention to provide a digital signal-processing system which executes DMA transfer processing and data processing concurrently or in parallel with each other according to its own program, and which has a hardware arrangement enabling effective prevention of overlapped access to a data memory due to the concurrent execution of the two kinds of processing without requiring the software to be conscious of that possibility.

To attain the first object of the invention, according to a first aspect of the invention, there is provided a method of controlling direct memory access for a digital signal-processing system which executes arithmetic processing of data read out from a data memory according to a program stored in a program memory, stores results of the arithmetic processing into the data memory, and transfers data to be subjected to the arithmetic processing and the results of the arithmetic processing between the data memory and an external device, by direct memory access.

The method according to the first aspect of the invention is characterized by comprising the steps of:

providing DMA instructions for executing data transfer by the direct memory access, in the program together with arithmetic processing instructions for executing the arithmetic processing;

decoding each of the DMA instructions during execution of the program; and executing the data transfer by the direct memory access between the data memory and the external device, according to the each of the DMA instructions which has been decoded during execution of the program, upon decoding thereof.

According to the method of controlling the direct memory access of the first aspect of the invention, the program stored in the program memory contains DMA instructions together with arithmetic processing instructions; and when each of the DMA instructions is decoded during execution of the program, the data transfer by the direct memory access (DMA transfer) is started. Therefore, a host CPU associated with the digital signal-processing system is not required to take part in the DMA transfer, and hence interrupt of the CPU can be dispensed with, thereby decreasing the burden on the CPU. Further, the DMA transfer can be directly started by the digital signal-processing system, which reduces the time period of suspension of the arithmetic processing of data.

Preferably, the DMA instructions each comprise a parameter-setting instruction for setting parameters for controlling the data transfer by the direct memory access and a DMA start instruction for starting the data transfer by the direct memory access between the data memory and the external device.

More preferably, the DMA instructions each include a DMA termination-confirming instruction for confirming termination of the data transfer by the direct memory access.

To attain the first object of the invention, according to a second aspect of the invention, there is provided a digital signal-processing system including:

a data memory that stores data therein;

a program memory that stores a program therein;

an instruction decoder that sequentially reads out instructions contained in the program from the program memory and decodes the instructions read out; and an arithmetic operation device that arithmetically processes data read out from the data memory under control of the instructions decoded by the instruction decoder.

The digital signal-processing system according to the second aspect of the invention is characterized in that the program contains arithmetic processing instructions for instructing execution of arithmetic operation of the data read out from the data memory, and DMA instructions for executing data transfer by direct memory access. The digital signal-processing system comprises a control device that starts the data transfer by the direct memory access between an external device and the data memory when each of the DMA instructions is decoded by the instruction decoder during execution of the program.

According to the digital signal-processing system according to the second aspect, the DMA transfer can be started without interrupting the CPU, which decreases the burden on the CPU.

Preferably, the digital signal-processing system includes a first bus through which data can be sent to and received from an external bus, and a plurality of second buses through which data for arithmetic processing can be transferred, the data memory comprising a plurality of data memories separately accessible via desired ones of the first bus and the plurality of second buses.

According to this preferred embodiment, it is possible to execute the DMA transfer to and from one of the data memories via the first bus while executing the arithmetic processing of data read from data memories other than one involved in the DMA transfer via the second buses. Therefore, it is possible to markedly enhance the efficiency of arithmetic processing of data.

Preferably, the DMA instructions are arranged between the arithmetic processing instructions, the digital signal-processing system being connected to an external DMA control device, the control device being responsive to a decoded one of the DMA instructions, for starting the external DMA control device to start the data transfer by the direct memory access between a selected one of the plurality of data memories and the external device via the first bus, and also responsive to a decoded one of the arithmetic processing instructions following the decoded one of the DMA instructions, for controlling the arithmetic operation device to execute arithmetic processing of data obtained by access to more than one of the plurality of data memories other than the selected one via the second buses, in parallel with the data transfer by the direct memory access between the selected one of the plurality of data memories and the external device via the first bus.

To attain the second object of the invention, in the digital signal-processing system of the second aspect of the invention, the program memory includes a program counter that counts a PC value designating an address of the program memory, the control device saving the PC value of the program counter when each of the DMA instructions has been decoded by the instruction decoder during execution of the program, then starting the data transfer by the direct memory access of a program from an external device to the program memory, and setting the saved PC value to the PC counter again after completion of the data transfer to the program memory by the direct memory access, to thereby permit execution of the first-mentioned program to be resumed.

According to this preferred embodiment, when a DMA instruction for the DMA transfer of a new program or continued portion of the program previously stored in the program memory is decoded, the PC value is saved, and then the external DMA control device is started to additionally supply the program memory with the new program or the continued portion of the program. After completion of the DMA transfer, the PC value is set again to the stored value to permit execution of the program to be resumed. Therefore, the digital signal-processing system operates to replenish a program or a continued portion of the stored program to be executed by itself, according to its own program, which dispenses with the need of the CPU taking part in writing the new program or the like into the program memory of the digital signal-processing system, thereby reducing the burden on the CPU. Further, even the system with a program memory having a small capacity can perform execution of a large-sized program with high efficiency. Further, at the time of initialization of the system in which the CPU is involved, transfer of the minimum required program suffices for starting the arithmetic processing, which also decreases burden on the CPU.

To attain the third object of the invention, in the digital signal-processing system of the second aspect of the invention, the digital signal-processing system includes a DMA execution flag-setting device that sets a plurality of flags each indicative of execution of the data transfer by the direct memory access to and from a corresponding one of the plurality of data memories, an overlapped access-detecting device that detects overlapped access to any of the plurality of data memories being involved in the data transfer by the direct memory access, based on the flags, and an overlap-preventing device that inhibits execution of the program when the overlapped access is detected.

According to this preferred embodiment, each flag indicates that the DMA transfer is being executed, and the overlap access-detecting device detects overlapped access to any of the data memories, based on the flags. The overlap-preventing device inhibits execution of the program when the overlapped access is detected. Therefore, the software is not required to be conscious of overlapped access to the same memory. This makes it unnecessary to write DMA termination-confirming instructions in a program, which contributes to curtailment of the capacity of the program RAM.

Preferably, the overlap-preventing device includes a gate device that gates instructions for access to the data memories which have been decoded by the instruction decoder device, based on the flags.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
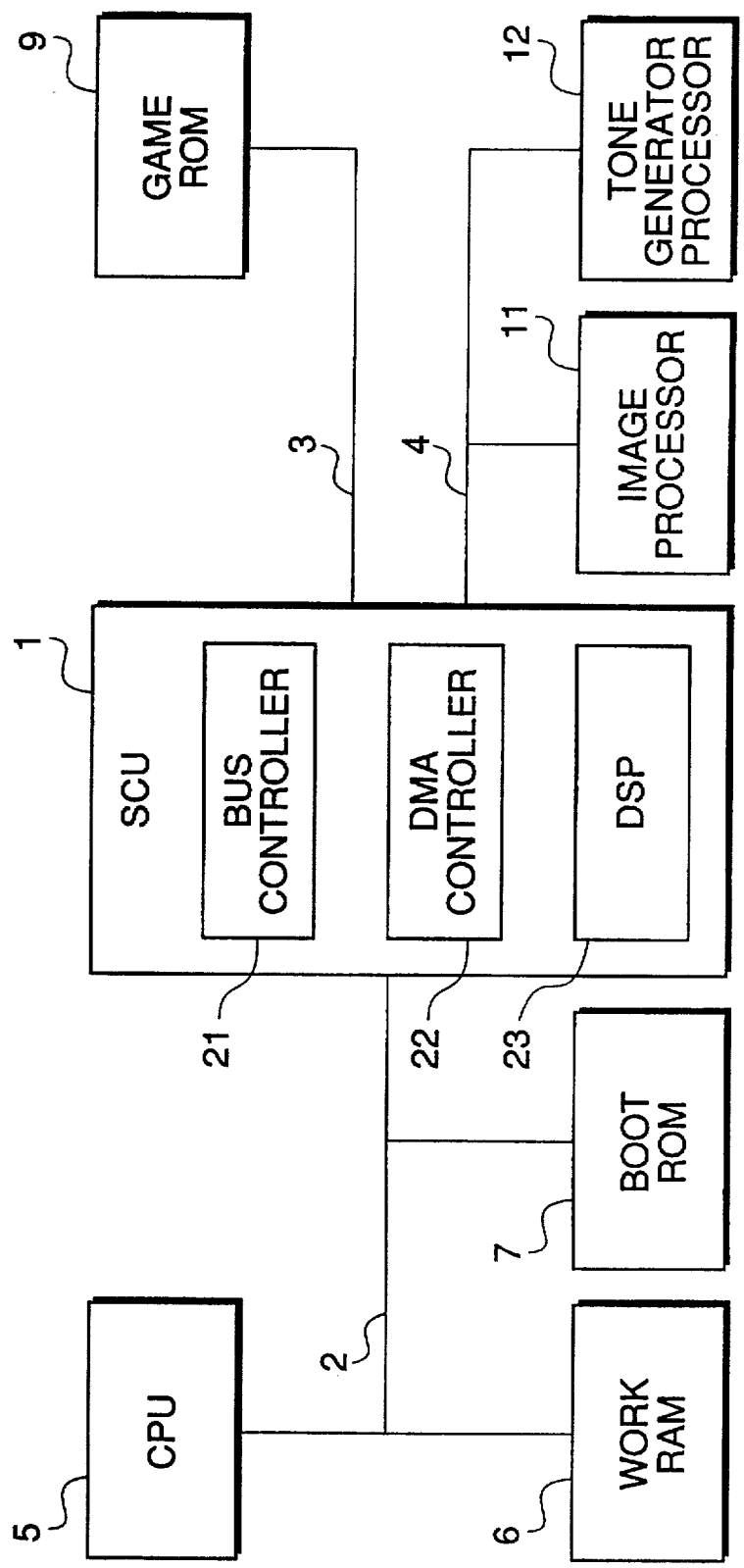
FIG. 1 is a block diagram schematically showing the whole arrangement of a game machine incorporating a digital signal-processing system according to an embodiment of the invention.

Referring first to FIG. 1, there is shown the arrangement of a game machine incorporating a digital signal-processing system according to an embodiment of the invention.

The game machine is comprised of a system control unit (hereinafter referred to as "SCU") 1, three buses 2, 3, and 4 connected to the SCU 1 and controlled thereby, and functioning elements connected to the buses. The bus 2 connects between a CPU 5 which controls the whole system, a work RAM 6 providing a working memory area for the CPU 5, and a boot read only memory (ROM) 7 storing a processing program to be executed when the system is started. The bus 3 connects between the SCU 1 and a game program source, such as a game ROM. The bus 4 connects between the SCU 1, an image processor 11, and a tone generator processor 12.

The SCU 1 is comprised of a bus controller 21 for executing switching control of the buses 2, 3, and 4, a DMA controller 22 for controlling DMA transfer of data, programs, and the like between internal memories and external devices, and a DSP 23 for executing product-sum operations of coefficient data and signal input data stored in its internal memories.

Figure 2:
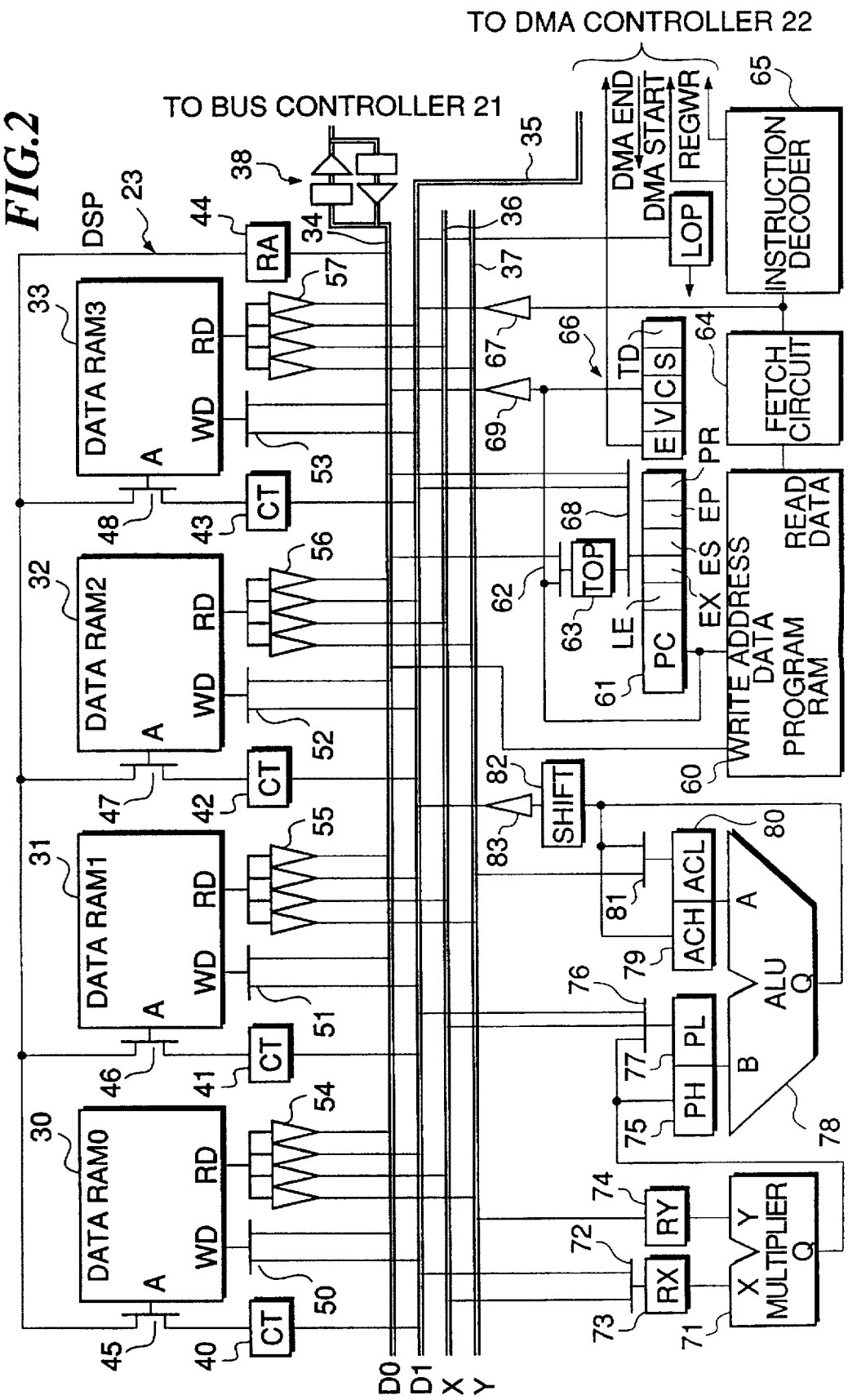
FIG. 2 is a block diagram showing details of a DSP appearing in FIG. 1.

FIG. 2 shows details of the arrangement of the DSP 23. The DSP 23 includes data RAM's 30 to 33 which can be accessed independently of each other via four buses 34 to 37 independent of each other. More specifically, a D0 bus 34 is connected to the bus controller 21 via a two-way buffer 38, to enable data to be transferred to and from the external buses 2, 3, and 4. The remaining three buses are a D1 bus 35, an X bus 36, and a Y bus 37 which are used by the DSP 23 for data processing. The D1 bus 35 is connected to the DMA controller 22 as well.

The data RAM's 30 to 33 have address terminals A supplied with addresses from respective selector circuits 45, 46, 47, and 48 which selectively deliver either addresses supplied from respective address counters (CT's) 40, 41, 42, and 43 commonly connected to the D1 bus, or an address from an address register (RA) 44 connected to the D0 bus 34 for common access by external devices. Further, the data RAM's 30 to 33 store either data on the D0 bus 34 or data on the D1 bus 35 which is selected by respective selector circuits 50, 51, 52, and 53. Further, data are read from the data RAM's 30 to 33 via respective gate circuits 54, 55, 56, and 57 into a desired one of the four buses 34 to 37 selected by each of the gate circuits.

The DSP 23 has a program RAM 60 which stores a program executed by the DSP 23, which is transferred from an external device, such as the work RAM 6, via the bus 2, the bus controller 21, the two-way buffer 38 and the D0 bus 34. An address for access to the program RAM 60 for instruction is designated by a program counter (PC) 61. Upon initialization of the DSP, the count (PC value) of the PC 61 is set to a value supplied from the external CPU 5 via the D0 bus 34 and a selector circuit 68 and stored into a TOP register 63. When the DMA transfer of a program to the program RAM 60 is executed, the count of the PC 61 is saved into the TOP register 63 via a selector circuit 62 prior to execution of the DMA transfer, and set to a value supplied from an instruction decoder 65 via the D1 bus 35 and a selector circuit 68.

An instruction code read from the RAM 60 according to the PC value is fetched by a fetch circuit 64 and decoded by the instruction decoder 65. The instruction decoder 65 controls various components of the DSP 23 based on the decoded instructions and rewrites various flags 66 such as E, V, C, and S. Further, the instruction decoder 65 executes setting of parameters for the DMA controller 22 and the starting control of the DMA transfer. In the setting of the parameters, data of the parameters fetched by the fetch circuit 64 are transferred to the DMA controller 22 via a gate circuit 67 and the D1 bus 35. The PC value and the flags 66 are set or updated to values supplied via the selector circuit 68 from the TOP register 63 and D0, D1 buses 34, 35, and transferred to external devices via a gate circuit 69 and the D0 bus 34.

The DSP 23 includes a multiplier 71 which multiplies data from an RX register 73 selectively stored therein via a selector circuit 72 from the D1 bus 35 or the X bus 36, by data from an RY register 74 stored therein from the Y bus 37. Predetermined more significant bits of the product are stored into a PH register 75, while predetermined less significant bits of the same are stored into an PL register 77 via a selector circuit 76. The PL register 77 also receives data on the D1 bus 35 or data on the X bus 36 for storage therein, which is selectively supplied via the selector circuit 76. The PH and PL registers 75, 77 are connected to a terminal B of an ALU 78 which has a terminal A to which are connected ACH and ACL registers 79, 80. The ALU 78 adds data from the PH and PL registers 75, 77 to data from the ACH and ACL registers 79, 80. Predetermined more significant bits of the resulting sum are stored into the ACH register 79, while predetermined less significant bits of the same are stored into the ACL register 80 via a selector circuit 81. At the same time, data indicative of the sum is delivered via a shift register 82 and a gate circuit 83 to the D1 bus 35. With this arrangement, the DSP 23 can execute data processing, such as a product-sum operation.

Next, the operation of this system will be described.

The CPU 5 first transfers a program to be executed by the DSP 23 and stored in the work RAM 6, to the program RAM 60 of the DSP 23. In doing this, due to limited capacity of the program RAM 60 of the DSP 23, the program is transferred from the work RAM 6 in amounts storable in the memory RAM 60 a plurality of times. Further, the CPU 5 transfers the PC value to the PC 61 for the DSP 23 to start the program. Then, an execution flag EX is set to 1, whereby the program is started.

Figure 3:
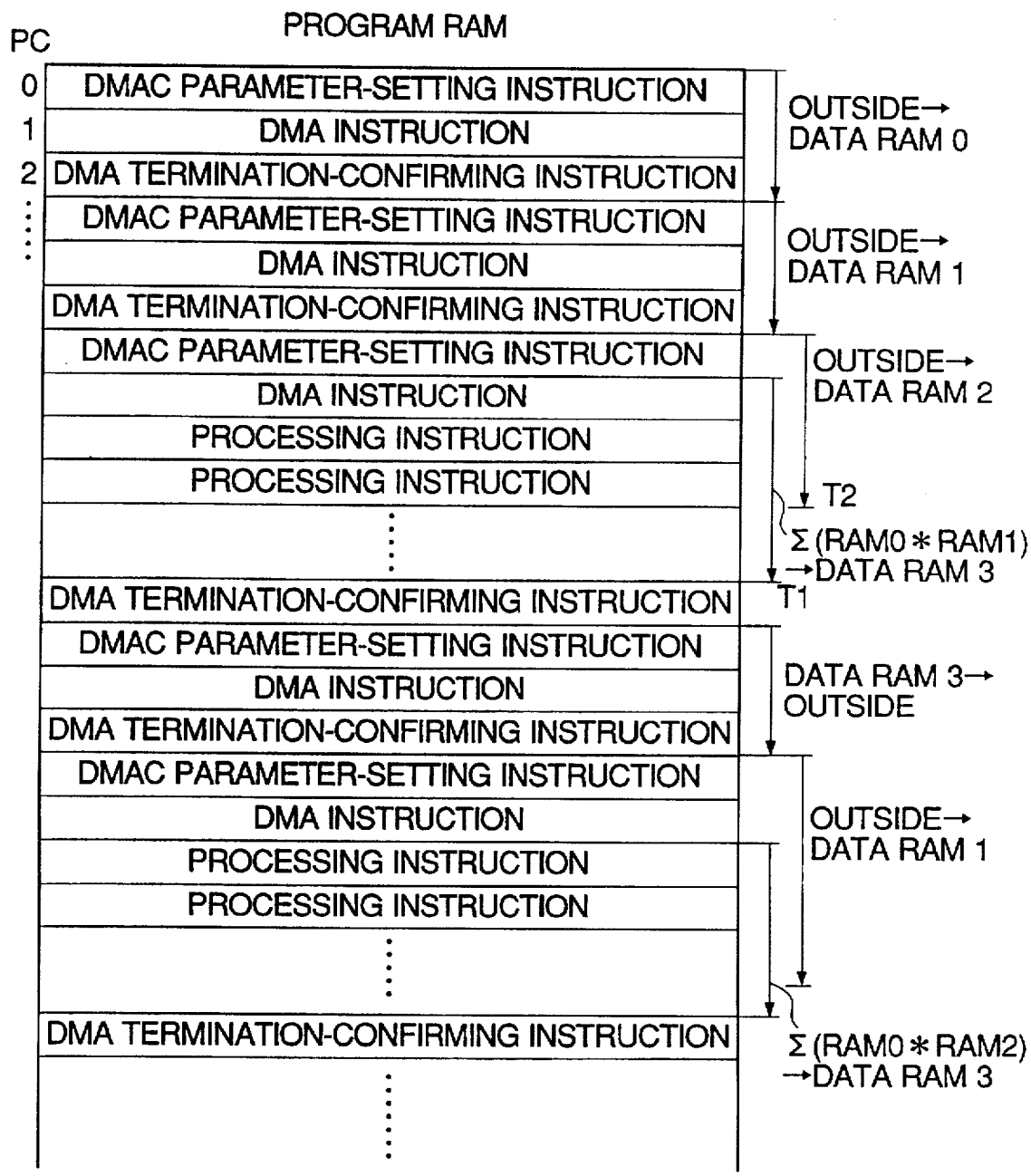
FIG. 3 shows an example of a format of a program stored in a program RAM of the FIG. 1 system.
Figure 4:
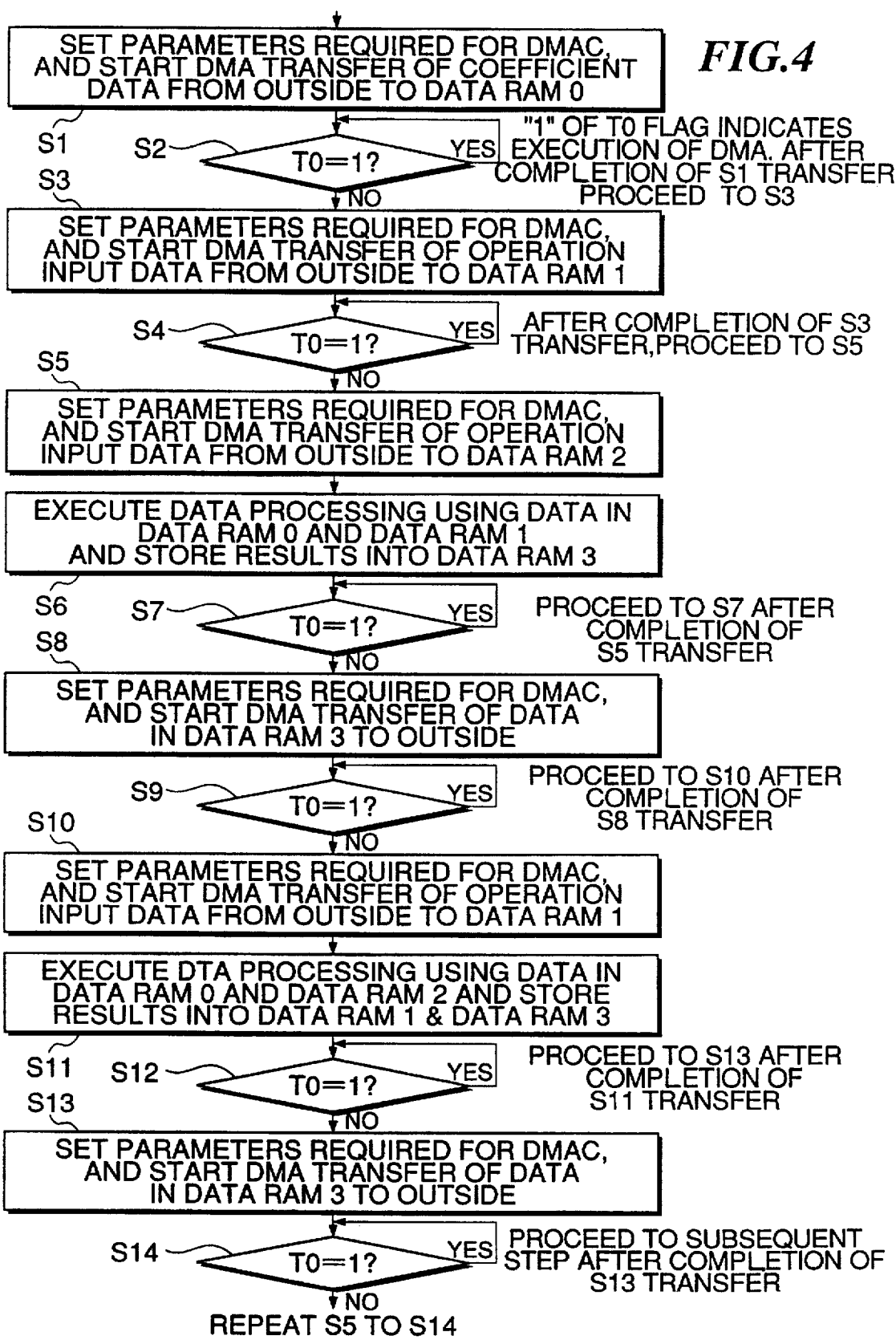
FIG. 4 is a flowchart showing details of data transfer processing executed according to the FIG. 3 program.

Once the program of the DSP 23 is started, the DSP 23 independently executes the following processing without requiring control by the CPU 5. FIG. 3 shows an example of the program stored in the program RAM 60, and FIG. 4 shows details of data processing executed according to the FIG. 3 program.

At the start of the program, the data RAM's 30 to 33 contain no data required by the DSP 23 for data processing, such as coefficient parameters and processing signal data. Therefore, it is necessary to supply the data RAM's 30 to 33 with these data. To this end, a DMAC (DMA control) parameter-setting instruction is set at the start address 0 of the program, and a DMA instruction and a DMA termination-confirming instruction are set at the following addresses. The instruction decoder 65 decodes the DMAC parameter-setting instruction, and then delivers the DMAC parameters of the decoded instruction to the D1 bus 35, and at the same time delivers a register write signal to the DMA controller 22. The DMAC parameters include a transfer source address, a transfer destination address, and the number of words to be transferred. For example, the transfer source address is the start address of an area of the work RAM 6 storing the coefficient data, and the number of words to be transferred is for example, the number of coefficient data items, both of which are set to the DMA controller 22, while the transfer destination address is, for example the start address of the data RAM 30, which is set to the address counter 40. Then, after the instruction decoder 65 decodes the DMA instruction, a DMA start signal is delivered from the decoder 65 to the DMA controller 22. The DMA controller 22 is responsive to the DMA start signal to execute DMA transfer of the coefficient data from the external work RAM 6 to the internal data RAM 30 (step S1).

Upon starting of the DMA transfer, a flag T0 is set to "1", and thereafter the flag T0 remains equal to "1" until the DMA controller 22 delivers a DMA termination signal. During execution of the following DMA termination-confirming instruction, a standby state of the DSP 23 continues until the flag T0 becomes equal to "0" (step S2).

Subsequently, operation input data are transferred by DMA transfer from an external device to the data RAM 31 (steps S3 and S4) in a similar manner to the above Further, operation input data are transferred by DMA transfer from the external device to the data RAM 32 as well, in a similar manner to the above (at a step S5). Now, the data RAM's 30 and 31 already store the coefficient data and the operation input data, and hence data processing can be executed by using these data. Therefore, when the DMA transfer of the operation input data to the data RAM 32 is started, a product-sum operation is immediately carried out by the multiplier 71 and the ALU 78 based on the coefficient data stored in the data RAM 30 and the operation input data stored in the data RAM 31, and results of the processing (processed data) are stored into the data RAM 33 at a step S6.

Figure 5A:
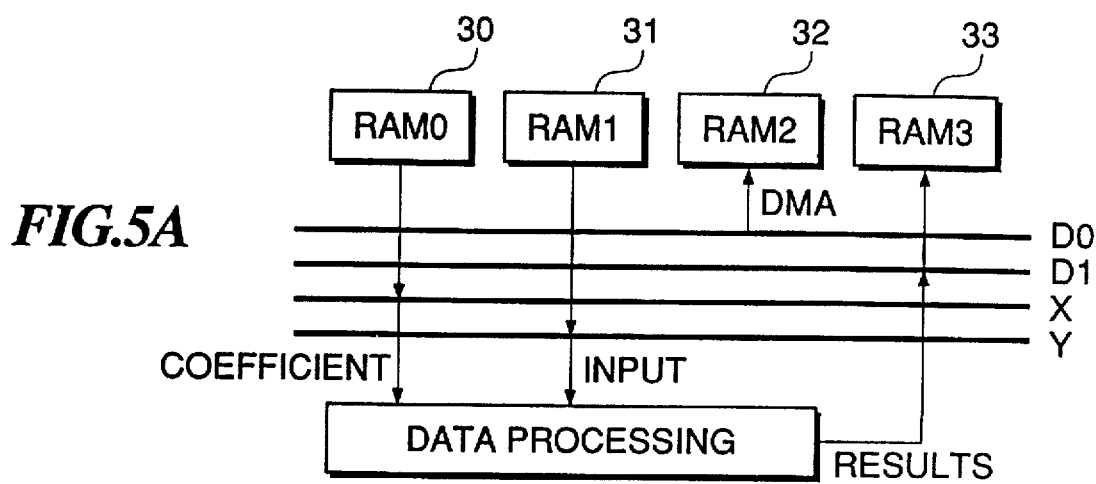
FIGS. 5A to 5C are diagrams illustrating flows of data transferred during execution of the data transfer processing according to the FIG. 4 program.

In this case, as shown in FIG. 5A, to prevent collision of data on a bus, the DMA transfer of data to the data RAM 32 is carried out via the D0 bus 34, while the coefficient data are read out from the data RAM 30 via the X bus 36, and the operation input data from the data RAM 31 via the Y bus 37. The processed data are written into the data RAM 33 via the D1 bus 35. In this way, independent transfer paths are provided, respectively, for these data, which enables the DMA transfer to the data RAM 32 to be executed concurrently or in parallel with data processing through access to the data RAM's 30, 31 and 33.

When a sequence of data processing has been completed, the DSP 23 executes a DMA termination-confirming instruction at a step S7. As shown in FIG. 3, when the DMA termination is checked at a time point T1, the DMA transfer is almost always completed (at a time point T2), and hence there is substantially no waiting time for a subsequent instruction.

Figure 5B:
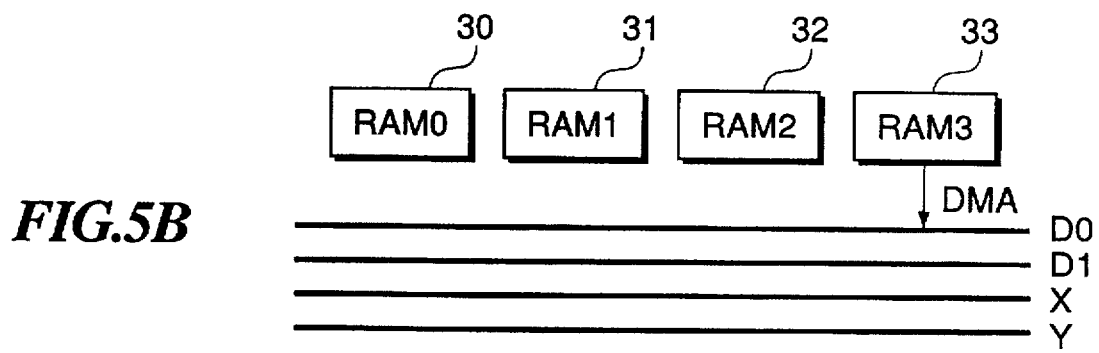
Figure 5C:
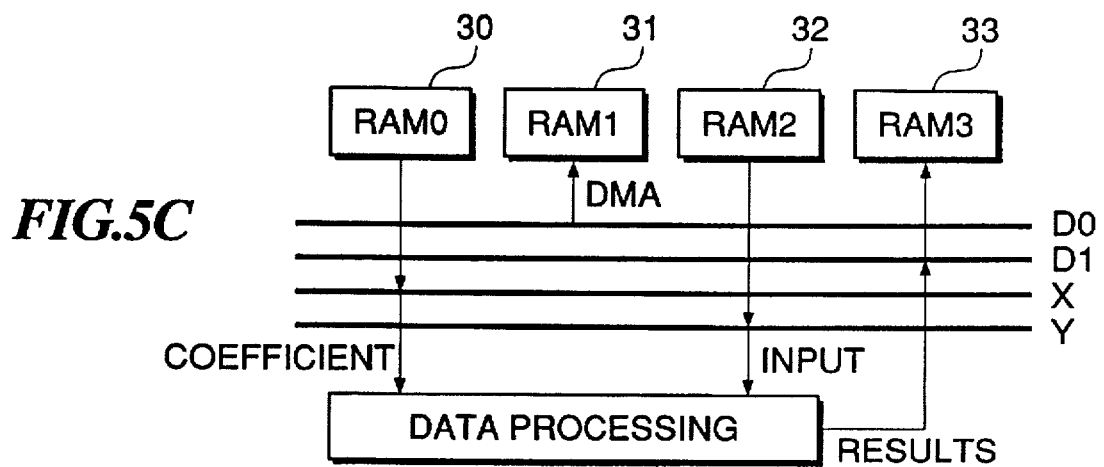

Then, the processed data stored in the data RAM 33 are transferred to the external device via the D0 bus 34 (step S8). This data transfer is illustrated in FIG. 5B. When the DMA termination has been confirmed at a step S9, the next DMA transfer of operation input data to the data RAM 31 is started at a step S10, and data processing is carried out by the use of the coefficient data stored in the data RAM 31 and the operation input data stored in the data RAM 32. The processed data are stored into the data RAM 33 at a step S11. The flows of the data transferred for these operations are illustrated in FIG. 5C. After the present sequence of data processing has been completed and the DMA termination has been confirmed at a step S12, the processed data stored in the data RAM 33 are transferred to the external device at a step S13. After the termination of the DMA transfer of the processed data is confirmed at a step S14, these steps S5 to S14 are repeatedly executed.

Figure 6:
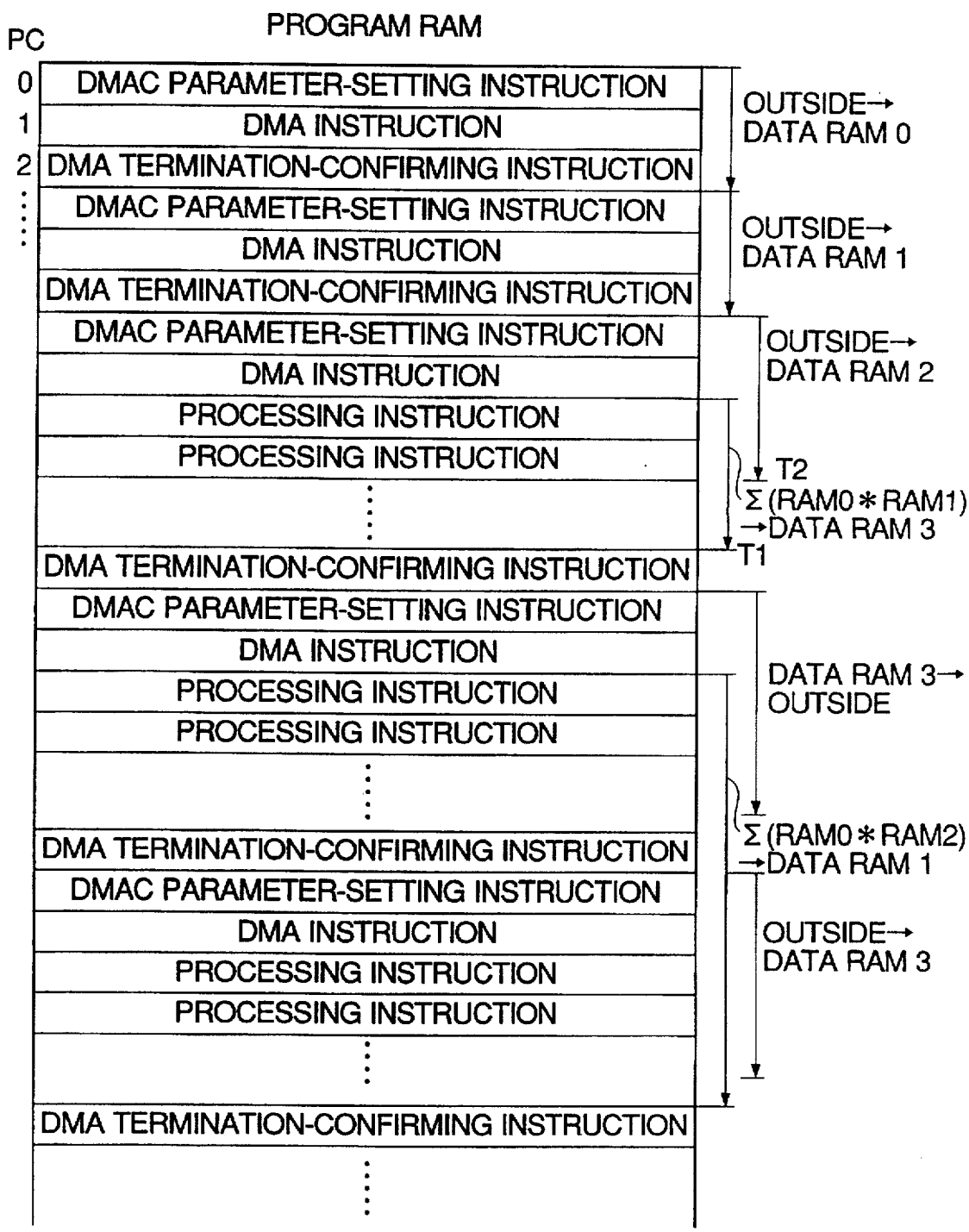
FIG. 6 is a diagram showing another example of the format of a program stored in the program RAM of the FIG. 1 system.
Figure 7A:
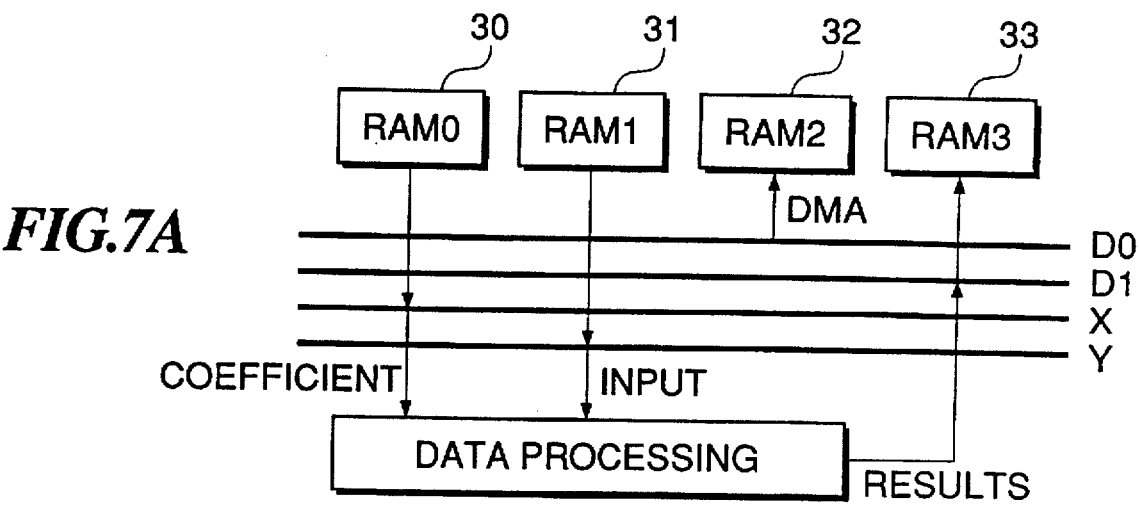
FIGS. 7A to 7C are diagrams illustrating flows of data transferred during execution of the data transfer processing according to the FIG. 6 program.
Figure 7B:
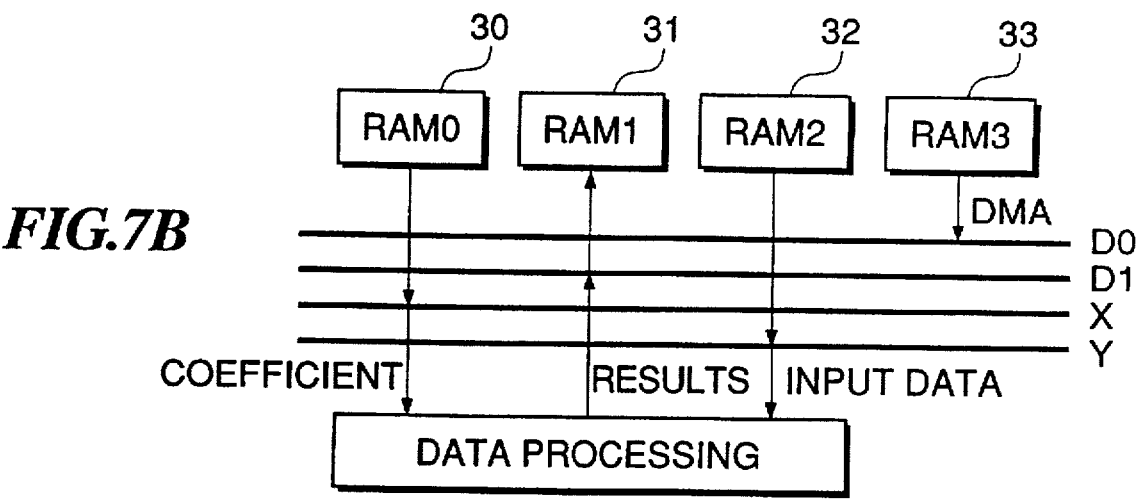
Figure 7C:
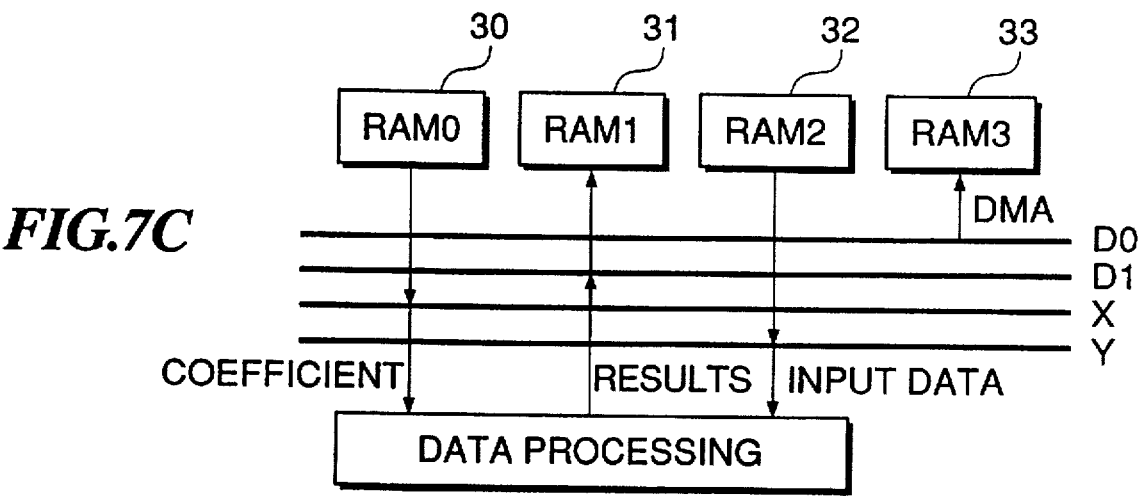

Further, the program executed by the DSP 23 may be written in another format, for example as shown in FIG. 6. According to this format, concurrently or in parallel with DMA transfer of processed data from the data RAM 33 to the external device, coefficient data stored in the data RAM 30 and operation input data stored in the data RAM 32 are used for data processing, while storing the resulting data into the data RAM 31. A DMA termination-confirming instruction may be provided at a location corresponding to a time point T3 at which the DMA transfer of the processed data from the data RAM 33 can be expected to be completed, thereby causing fresh operation input data to be DMA-transferred from the external device to the data RAM 33. The flows of the data transferred in the present case are illustrated in FIG. 7A to 7C. In the event the time period required for the DMA transfer is much shorter than time period required for the data processing, two DMA transfer to and from the data RAM 33 and the data processing can be executed in parallel with each other, which makes it possible to perform more efficient data processing. In this case, the next sequence of data processing is carried out by the use of data stored in the data RAM 30 and the data RAM 33, while the data stored in the data RAM 31 is replaced by the new processed data.

Although in the above processing instructions for confirming the termination of DMA transfer are inserted in the program, they may be omitted if a time period required for the DMA transfer of data is known in advance, particularly for concurrent or parallel execution of the DMA transfer and the data processing, by arranging a subsequent DMA transfer instruction or a subsequent processing instruction at a location corresponding to a PC value later than a PC value expected to indicate the lapse of a time period required for the DMA transfer of the specific data.

To realize the above described processing, address values generated by the address counters (CT) 40 to 43 for designating addresses by which the data RAM's 30 to 33 are accessed can be rewritten through instructions from the DSP 23, that is, internal instructions, and hence be incremented both by instructions from the DSP and from the DMA controller 23.

However, since the values of the CT's 40 to 43 can be thus controlled by both the DSP 23 and the DMA controller 22, overlapped access to the same data RAM can take place. That is, a data RAM to or from which a DMA transfer is being carried out and a data RAM accessed for data processing can be identical with each other, depending upon the description of the software, due to employment of the system permitting parallel execution of the DMA transfer and the data processing.

Figure 8:
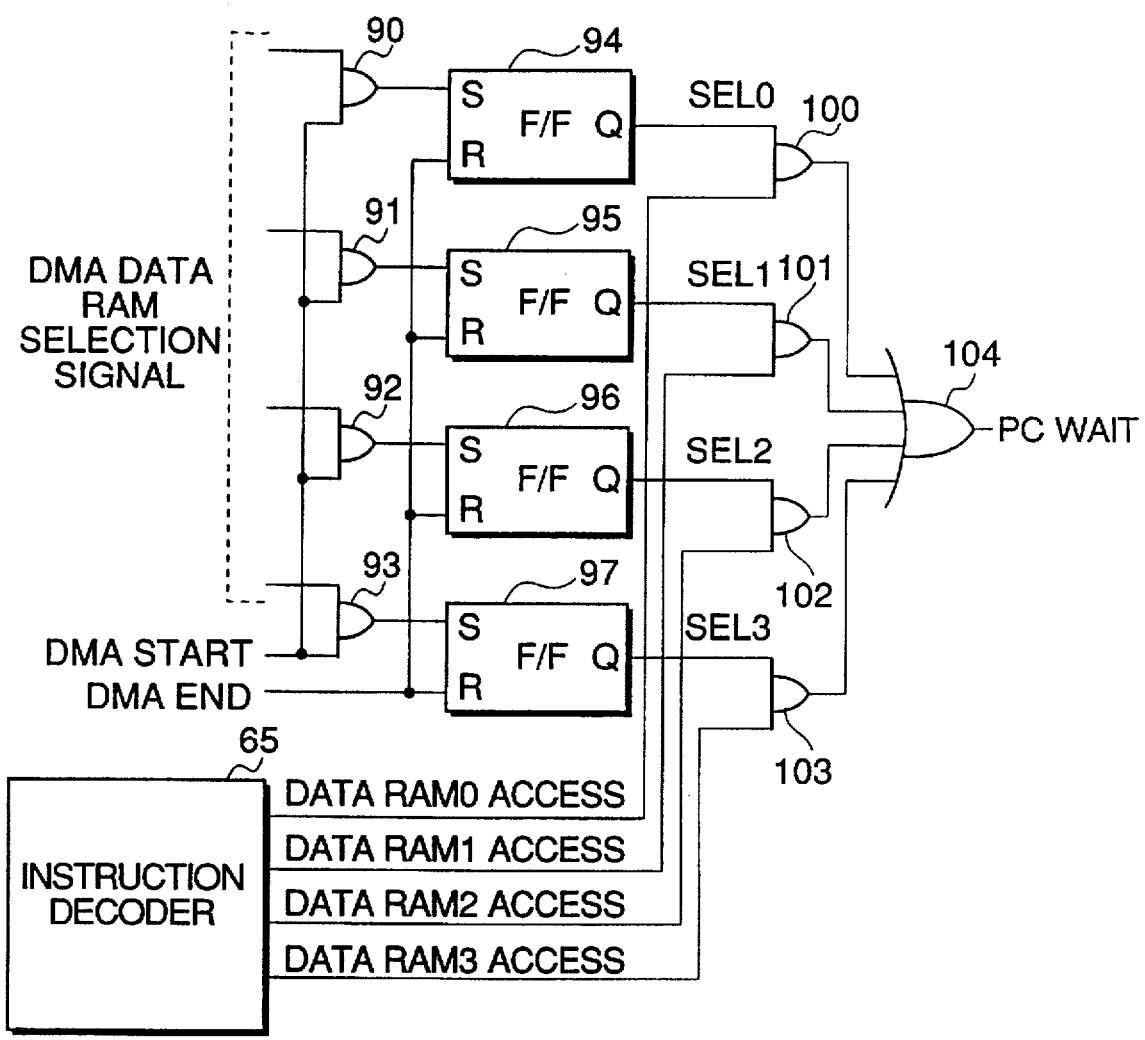
FIG. 8 is a circuit diagram showing an overlap prevention circuit for use in the FIG. 1 system.

To avoid this inconvenience, it is preferred that flags SEL0 to SEL3 are provided, respectively, for the CT's 40 to 43 providing addresses by which the data RAM's 30 to 33 are accessed, each of which flags indicates a state of the corresponding data RAM being selected for the DMA transfer, and an overlap prevention circuit which uses the flags SEL0 to SEL3, as shown in FIG. 8, is added to the FIG. 2 circuit.

The overlap prevention circuit is comprised of gate circuits 90 to 93, each of which is supplied with a DATARAM selection signal obtained from the DMAC parameters and a DMA START signal from the instruction detector 65, flip-flop circuits 94 to 97 connected at set terminals S thereof to output terminals of the respective gate circuits 90 to 93, and gate circuits 100 to 103 connected at input terminals thereof to output terminals Q of the respective flip-flops 94 to 97. The flip-flop circuits 94 to 97 have reset terminals R thereof supplied with a DMA END signal. The gate circuits 100 to 103 are supplied with access signals from the instruction decoder 65. The gate circuits 100 to 101 have respective output terminals thereof connected to an OR gate circuit 104, which delivers a PC WAIT signal to stop the program counter 61.

According to the overlap prevention circuit constructed as above, an AND output of the DATARAM selection signal obtained from the DMAC parameters and the DMA START signal delivered from the instruction decoder 65 is generated from each of the gate circuits 90 to 93. The AND output of "1" from these circuits 90 to 93 causes a corresponding one of the flip-flop circuits 94 to 97 to be set, while a DMA END (DMA termination) signal delivered from the DMA controller 22 causes the flip-flop circuits 94 to 97 to be reset. This arrangement causes one of the flip-flops 94 to 97 correspondent to one of the data RAM's 30 to 33 which is currently involved in the DMA transfer to deliver an output value of "1". Access signals DATA RAMi ACCESS delivered from the instruction decoder 65 for access to the data RAM's 30 to 33 are gated based on the flags SEL0 to SEL3 as output signals from the flip-flops 94 to 97, whereby one of the gate circuits 100 to 103 corresponding to a data RAM instructed for access by the instruction decoder 65 during execution of the DMA transfer generates an output of "1". When this output value of "1" is detected by the OR gate circuit 104, a PC WAIT signal is delivered from the circuit 104 to stop the program counter 61, thereby holding the program from being executed. This prevents a specific data RAM which is being involved in the DMA transfer from being accessed for any purpose including rewriting of a corresponding one of the address counters 40 to 43. This arrangement allows use of a program with a description which is written without being conscious of a possibility of overlapped access to any of the data RAM's.

Next, the DMA transfer of a program will be described.

As described before, it is impossible to store the whole program to be executed by the DSP 23 into the program RAM 60 at one time, since the program RAM 60 is limited in capacity.

Figure 9:
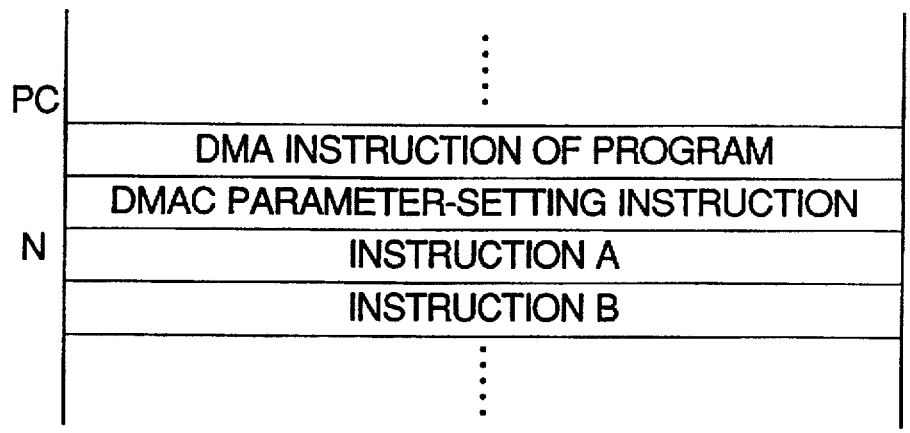
FIG. 9 is a diagram showing an example of the format of a program using DMA transfer instructions for the FIG. 1 system.
Figure 10:
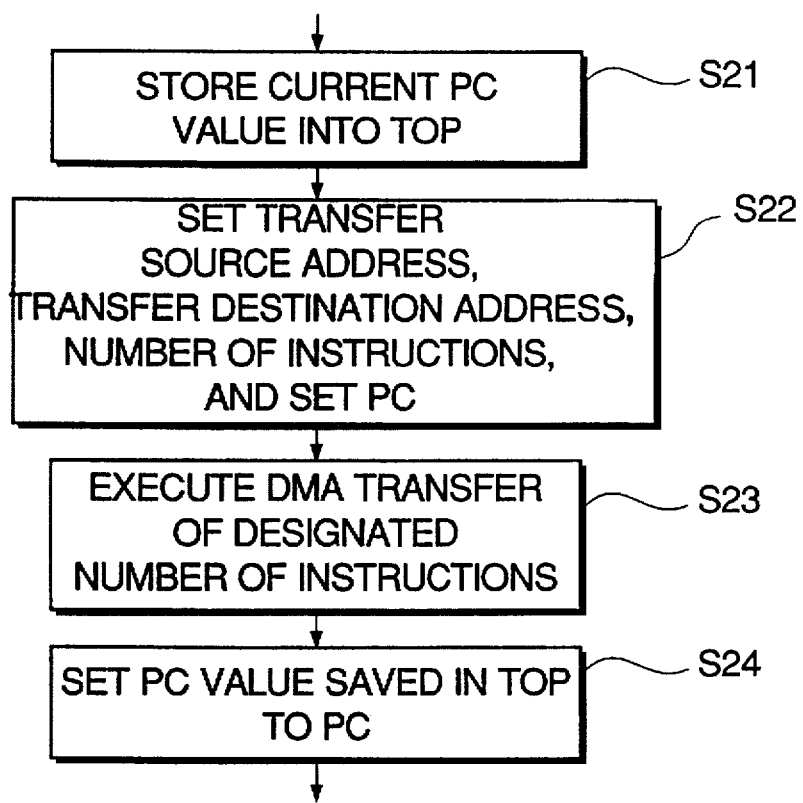
FIG. 10 is a flowchart showing a procedure of processing executed according to the FIG. 9 program.

To overcome this inconvenience, a DMA transfer instruction for transfer of a program to the program RAM 60 is written in the program executed by the DSP 23, as shown in FIG. 9. Steps of processing executed in response to the DMA transfer instruction are shown in FIG. 10.

When a DMA instruction of the program is executed, the present PC value is saved into the TOP register 63 at a step S21. More specifically, at the time point the DMA instruction is executed, the fetch circuit 64 has the next DMAC parameter-setting instruction prefetched therein, so that the PC value indicates an address (N shown in FIG. 9) for data next to the DMAC parameter-setting instruction. Accordingly, the TOP register 63 stores the address N. Execution of a DMAC parameter-setting instruction following the DMA instruction causes setting a transfer source address, a transfer destination address and the number of instructions to be transferred, to the DMA controller 22, while the transfer destination address is set to the program counter 61 at a step S22. Then, the set number of instructions is transferred from the external device via the DO bus 34 to the program RAM 60 by DMA transfer at a step S23. For example, when the transfer destination address is set to the address N next to the address for the DMAC parameter as shown FIG. 9, new instructions A, B, . . . are sequentially stored into the program RAM 60 at locations starting from the address N next to the DMAC parameter-setting instruction. Then, when DMA transfers of the set number have been completed, the PC value saved in the TOP register 63 is set to the program counter 61 at a step S24. Thereafter, execution of the program is resumed starting with the instruction A next to the DMAC parameter-setting instruction.

As described heretofore, the DSP 23 transfers by DMA transfer a program executed thereby according to the program of its own, whereby a program having any length can be continuously executed without increasing the burden on the CPU 5 irrespective of the capacity of the program RAM 60.

What is claimed is:

1. In a method of controlling direct memory access (DMA) for a digital signal-processing system which includes a digital signal processor and a DMA controller, the digital signal processor having a data memory that stores data therein, a program memory that stores a program therein, an instruction decoder that sequentially reads out instruction contained in the program from the program memory and decodes the instruction read out and an arithmetic operation device that arithmetically processes data read out from the data memory under control of the instructions decoded by the instruction decoder, and the DMA controller controlling data transfer by direct memory access between either of the data memory and the program memory on one end and an external device on the other end;

the improvement comprising the steps of:

providing DMA instructions for executing data transfer by the direct memory access in the program together with arithmetic processing instructions for executing the arithmetic processing;

decoding each of the DMA instructions during execution of the program by using the instruction decoder; and outputting each of the decoded DMA instructions from the instruction decoder to the DMA controller to execute the data transfer by the direct memory access between either of the data memory and the program memory on one end and the external device on the other end.

2. A method of controlling direct memory access according to claim 1, wherein the DMA instructions include a parameter-setting instruction for setting parameters for controlling the data transfer by the direct memory access, and a DMA start instruction for starting the data transfer by the direct memory access between the data memory and the external device.

3. A method of controlling direct memory access according to claim 2, wherein the DMA instructions include a DMA termination-confirming instruction for confirming termination of the data transfer by the direct memory access.

4. A digital signal processor comprising:

data memory that stores data therein;

a program memory that stores a program therein, the digital signal processor being connected to a DMA controller that controls data transfer by direct memory access between either of the data memory and the program memory on one end and an external device on the other end;

an instruction decoder that sequentially reads out instructions contained in the program from the program memory and decodes the instructions read out; and an arithmetic operation device that arithmetically processes data read out from the data memory under control of the instructions decoded by the instruction decoder, the improvement wherein:

the program contains arithmetic processing instructions for instructing execution of arithmetic operation of the data read out from the data memory, and DMA instructions for executing data transfer by direct memory access; and the instruction decoder outputs each of the DMA instructions to the DMA controller to execute the data transfer by the direct memory access between the either of the data memory and the program memory on one end and the external device on the other end when each of the DMA instructions is decoded by the instruction decoder during execution of the program.

5. A digital signal processor according to claim 4, further comprising:

an externally communicating bus through which data can be sent to and received from an external bus; and a plurality of internal buses for transferring the data for arithmetic processing, wherein the data memory comprises a plurality of memory units which are separately accessible by the externally communicating bus and the plurality of internal buses.

6. A digital signal processor according to claim 5, wherein the DMA instructions are arranged between the arithmetic processing instructions, the DMA controller is responsive to a decoded one of the DMA instructions to start the data transfer by the direct memory access between a selected one of the plurality of memory units and the external device via the externally communicating bus, and the arithmetic operation device is responsive to a decoded one of the arithmetic processing instructions which controls the arithmetic operation device to execute arithmetic processing of data obtained by accessing a plurality of the memory units in parallel with the data transfer by the direct memory access between the selected memory unit and the external device via the externally communicating bus.

7. A digital signal processor according to claim 4, further comprising a program counter that counts a PC value designating an address of the program memory.

8. A digital signal processor according to claim 5, further comprising a program counter that counts a PC value designating an address of the program memory.

9. A digital signal processor according to claim 6, further comprising a program counter that counts a PC value designating an address of the program memory.

10. A digital signal processor according to claim 5 further comprising:

a DMA execution flagsetting device that sets a plurality of flags each indicative of execution of the data transfer by the direct memory access to and from a corresponding one of the plurality of memory units;

an overlapped access detecting device that detects, based on the flags, overlapped access to any of the plurality of memory units being involved in the data transfer by the direct memory access; and an overlap-preventing device that inhibits execution of the program when the overlapped access is detected.

11. A digital signal processor according to claim 10, wherein the overlap-preventing device includes a gate device that gates, based on the flags, instructions for access to the memory units, which have been decoded by the instruction decoder device.

12. A digital signal processor according to claim 7, wherein the PC value is saved when the data transfer by the direct memory access between the program memory and an external device is initiated to transfer a program from the external device to the program memory, and the saved PC value is re-loaded into the program counter when the data transfer between the program memory and the external device is completed.

13. A digital signal processor according to claim 8, wherein the PC value is saved when the data transfer by the direct memory access between the program memory and an external device is initiated to transfer a program from the external device to the program memory, and the saved PC value is re-loaded into the program counter when the data transfer between the program memory and the external device is completed.

14. A digital signal processor according to claim 9, wherein the PC value is saved when the data transfer by the direct memory access between the program memory and an external device is initiated to transfer a program from the external device to the program memory, and the saved PC value is re-loaded into the program counter when the data transfer between the program memory and the external device is completed.

* * * * *